United States Patent

[11] 3,619,542

| [72] | Inventor | Edgar D. Oppenheimer<br>Mamaroneck, N.Y. |
|---|---|---|
| [21] | Appl. No. | 887,716 |
| [22] | Filed | Dec. 23, 1969 |
| [45] | Patented | Nov. 9, 1971 |
| [73] | Assignee | AMF Incorporated |

[54] METHOD AND APPARATUS FOR WELDING IN CONTROLLED ATMOSPHERE
17 Claims, 10 Drawing Figs.

[52] U.S. Cl.............................................. 219/67,
219/59, 219/102, 219/104
[51] Int. Cl..................................................... B23k 31/06
[50] Field of Search........................................... 219/59, 62,
64, 67, 85, 101, 102, 104, 105, 107, 72, 74

[56] References Cited
UNITED STATES PATENTS
2,776,474 1/1957 Melcher....................... 219/8.5 X

| 2,794,108 | 5/1957 | Park............................. | 219/67 |
| 2,800,561 | 7/1957 | Shenk........................... | 219/8.5 |
| 2,991,345 | 7/1961 | Johnson........................ | 219/8.5 |

FOREIGN PATENTS

| 1,219,607 | 6/1966 | Germany....................... | 219/67 |

*Primary Examiner*—J. V. Truhe
*Assistant Examiner*—L. A. Schutzman
*Attorneys*—George W. Price and John H. Gallagher

ABSTRACT: First and second gas shoes are placed respectively, on opposite surfaces of two adjacent portions to be welded. Shoes have recesses therein to form cavity which includes spaced edges of two portions upstream of weld zone. Tips of shoes are upstream of weld zone. Gas under pressure is admitted to cavity to bathe edges in controlled atmosphere and gas in a jet escapes at tips of shoes and is directed into weld zone to envelop weld zone in controlled atmosphere.

INVENTOR.
EDGAR D. OPPENHEIMER
BY
John H. Gallagher
ATTORNEY

INVENTOR
EDGAR D. OPPENHEIMER
BY John H. Gallagher
ATTORNEY

INVENTOR.
EDGAR D. OPPENHEIMER
BY
John H. Gallagher
ATTORNEY 3,619,542

METHOD AND APPARATUS FOR WELDING IN CONTROLLED ATMOSPHERE

BACKGROUND OF THE INVENTION

High-frequency resistance welding is extensively practiced in the manufacture of pipes and tubing as well as in the formation of various other types of structural members. It is characteristic of this type of welding that the two edges that are to be welded, or two surfaces, or a surface and an edge that are to be joined, are brought together so as to form a vee-shaped configuration and high-frequency current is caused to flow in adjacent paths along the adjacent edges of the vee to heat those edges. In the region of the apex of the vee the metal reaches welding temperature and as a result of forces being applied in the region of the apex, the two heated edges are forced together to form the weld.

As now practiced in most mills and fabricating plants, the apex region where the weld is formed, hereafter called the weld region or weld zone, is subject to the environmental conditions of the mill or plant, which means that the weld is formed in the presence of ambient air and often in the presence of a mill fluid such as water and/or a light oil. The mill fluid is directed in a continuous stream onto the pressure rollers to reduce the friction between the rollers and the moving pipe, for example, and usually is applied in such abundance that the weld region is enveloped by the fluid. The presence of the air and mill fluid at the weld region gives rise to oxidation of the heated metal and also gives rise to the inclusion within the weld of residue of the mill fluid. The included residue often is oxidizable and/or reactive. It is believed that oxidized metal in the weld and the inclusion of oxidizable and reactive residue within the weld contributes to the formation of corrosion pitting of the weld, and when the pipe is subsequently subjected to hydraulic or pneumatic pressure, or to mechanical stress, the pipe may develop a leak or fail along the weld line.

The problems just mentioned are particularly encountered in stainless steel tubing which is used in pressurized conduit systems in chemical-processing plants and in steam powerplant condensers.

In the manufacture of longitudinally welded stainless steel tubing, regardless of its intended use, it is desirable that the weld be formed as smoothly and evenly as possible, and with as little as possible discoloration or impairment of the bright finish. Obviously, oxidation and inclusion of residue in the weld will be detrimental to the smoothness and bright finish of the tube.

In the discussion herein the terms tube and pipe both are used. For some purposes a distinction is made between the two terms in that tube often is intended to denote tubular goods of smaller diameter. For purposes of explaining the present invention no such distinction is intended inasmuch as the diameter of the tubular goods being formed generally is not important to the practice of the invention.

In an attempt to overcome the problems mentioned above it has been proposed to manufacture pipe and tubing, and particularly stainless steel tubing, by providing and inert atmosphere at or adjacent the weld zone so that the weld is formed in an nonoxidizing and nonreactive environment. For example, in U.S. Pat. Nos. 2,800,561 and 2,991,345, it is suggested that a jet of an inert gas be directed from a nozzle onto the weld zone of the pipe as it is being formed. The difficulty with this arrangement is that surrounding air and mill fluid is drawn into the gas jet so that in fact the weld zone is subjected to the influence of the air and mill fluid within the jet.

In U.S. Pat. No. 2,794,108 it is suggested that gas impervious hoods be placed on the outer and inner surfaces of the cylindrically formed metal strip to enclose the weld zone, the heated edges and the edges upstream of the heated edges where the edges are scraped and cleaned. An inert gas is introduced into the hoods to protect the cleaned and the heated edges and the weld zone. This arrangement is not practical for production operation because the weld spume given off at the weld zone, which is within the hoods, solidifies and accumulates within the hoods. Obviously, the accumulation of solidified spume and other matter within the hoods leads among other things, to problems of inclusion of that matter within the weld and will lead to difficulties in maintaining the desired current flow along the edges of the vee.

Another attempt to provide an inert atmosphere in the vicinity of the weld zone is disclosed in German Pat. No. 1,219,607 wherein first and second shoe members having recesses therein are placed on the top and bottom surfaces of the edge portions of the cylindrically formed, but unwelded metal strip so as to envelope the edges of the strip in the region immediately upstream of the weld zone but not including the weld zone. The two shoes form a cavity into which an inert gas is introduced to bathe the edges of the vee therein. However, the volume of gas to be utilized apparently is a matter of primary concern to the patentee, and in order to minimize the amount of gas required, a gas exit tube and a closed distribution system is provided to withdraw gas from the cavity at the downstream ends of the shoes and recirculate the gas to the upstream end of the cavity. In the arrangement of this German patent, the cavity terminates at the upstream side of the weld zone and because the gas is extracted from the cavity at its region nearest the weld zone, and because the gas pressure within the cavity is kept at a very low level to minimize the escape of gas from the cavity, very little, if any, inert gas actually is directed into the apex of the vee, i.e., into the weld zone. Although the heated edges of the vee are immersed in an inert atmosphere by the apparatus disclosed in the German patent, the problems discussed above are not completely overcome because the nonoxidizing and nonreactive atmosphere does not extend to the apex of the vee where the metal edges are hottest and where the weld actually is formed.

SUMMARY OF THE INVENTION

In accordance with on embodiment of the present invention I provide a pair of shoes having respective recesses therein and contoured to conform to the respective outer and inner surfaces of a cylindrically formed metal strip. The shoes are located upstream from the weld zone so as to leave a slight gap of a fraction of an inch between the tips of the shoes and the apex of the vee. The shoes are resiliently urged into contact with the outer and inner surfaces of the cylindrically formed strip and the recesses in the two shoes are in registration so as to form a cavity that has included therein the edges of the vee. An inert gas, a reducing gas, or some other fluid under pressure is introduced into the cavity and the static pressure of the inert gas, for example, within the cavity is maintained sufficiently high so that it escapes with substantial velocity through the vee at the tips of the shoes adjacent the apex so that not only are the heated edges of the vee immersed in the inert atmosphere of the cavity but a jet of inert gas also is directed into and around the apex of the vee to bathe the weld zone in a controlled atmosphere. The gas jet also expells mill fluid and weld spume from the weld region and minimizes the inclusion of foreign matter in the weld. Additionally, because of the high pressure of the gas within the cavity, and because of the imperfect seal between the stationary shoes and the moving pipe, gas escapes upstream in the vee and all about the shoes and tends to flush away air and mill fluid from the entire region of the vee upstream from the weld zone. In the practice of this invention the consumption of gas is not excessive and is well within commercial acceptance. The shoes that form the cavity are made of an electrically nonconductive material that can withstand the high temperature and the physical environment to which they are subjected.

BRIEF DESCRIPTION OF THE DRAWINGS

FIGS. 2 1 and 3 are, respectively, longitudinal and transverse sectional views of FIG. 1 showing the essential features of the present invention;

DETAILED DESCRIPTION OF THE DRAWINGS

Figure 1:
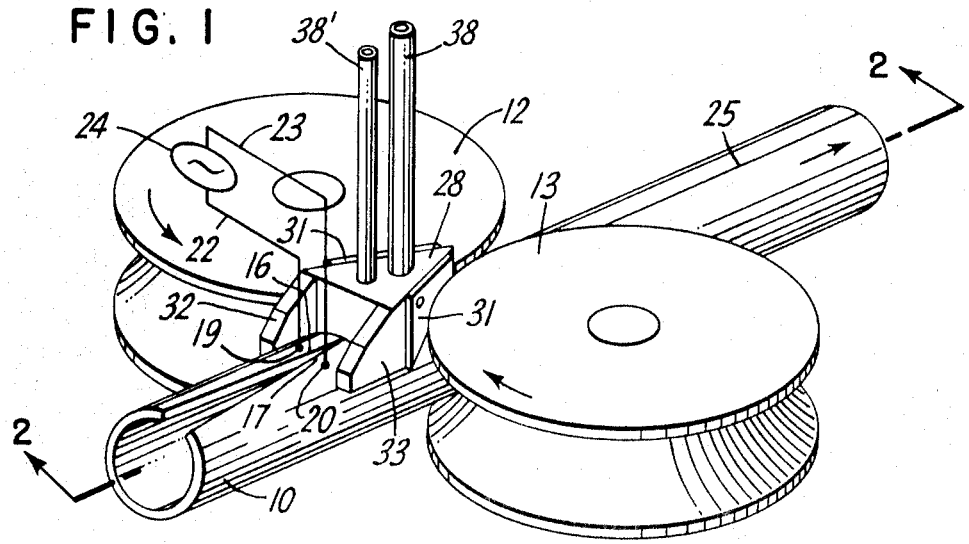
FIG. 1 is a simplified illustration of a tubular member being welded in accordance with the present invention.

FIGS. 1-4 illustrate in simplified form the details of the invention and how it would be practiced in a pipe mill. FIG. 1 illustrates a strip of metal 10 such as stainless steel which has been formed into a tubular shape by means well known to those skilled in the art. Before the tubular strip passes between squeeze rolls 12 and 13 of the mill the adjacent edges 16 and 17 are slightly spaced from each other. Squeeze rolls 12 and 13 bring the edges 16 and 17 together at the weld zone or region 18, FIG. 2, to form a vee configuration whose apex is at the weld zone 18. The adjacent edges are heated by a high-frequency current applied to the surfaces of the unclosed tube by contacts 19 and 20 which are shown schematically in FIG. 1. In practice, contacts 19 and 20 are conductive blocks. Leads 22 and 23 supply high-frequency current to contacts 19 and 20 from a generator 24 which may have an oscillating frequency of 100 to 500 kilohertz, as an example. As is well understood in the art, the high-frequency current applied to contacts 19 and 20 flows along the edges 16 and 17 of the vee to and from the weld zone 18 to heat the edges to welding temperature. When the heated edges are forced together by squeeze rolls 12 and 13, the longitudinally extending weld line 25 is formed as the tubular sheet continuously passes through the rolls.

Figure 3:
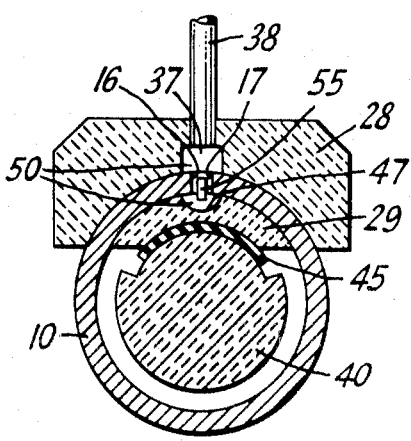
Figure 2:
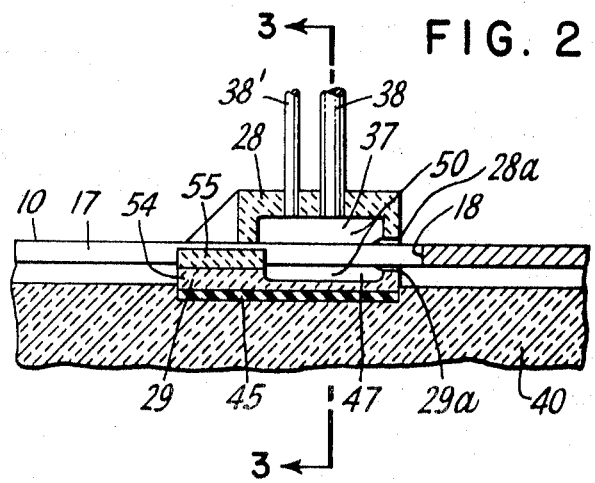
Figure 4:
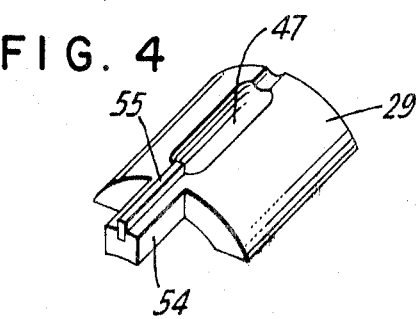
FIG. 4 is a perspective view of an inner gas shoe that is illustrated in section in FIGS. 2 and 3.

In accordance with the present invention, a controlled atmosphere is provided at the weld zone 18 and along the edges 16 and 17 upstream of the weld zone by an outer shoe member 28 and an inner shoe member 29, FIGS. 2-4. Both shoes are made of an electrically nonconductive material which can withstand the high temperatures that are present in the regions of the heated edges. I have successfully used a ceramic material sold under the name Aremcolox Machinable Ceramic 502,1100, by Aremco Products, Inc., P.O. Box 145, Briarcliff Manor, N.Y.

As seen in FIG. 1, the downstream end of outer shoe 28 is wedge-shaped and is disposed between rolls 12 and 13. Wear resistant shims, such as shim 31, are secured to the surfaces of the wedge-shaped end of shoe 28 and these surfaces are in contact with rolls 12 and 13 as the rolls rotate. The shims may be made of nylon or a similar material so that not only are they wear resistant but they provide low-friction contacts with rolls 12 and 13. The action of the wedge-shaped end contacting the rotating rolls 12 and 13 serves to maintain shoe 28 centered therebetween and thus centered over the vee of the unwelded tube. The extensions 32 and 33 at the upstream end of shoe 28 serve to steady the shoe on the tube and prevent it from becoming cocked.

As best seen in FIGS. 2 and 3, the bottom surface of outer shoe 28 is contoured to conform to the outer surface of tube 10. Shoe 28 is resiliently urged against tube 10 by suitable means, not illustrated, to maintain it in sliding engagement with tube 10 as the tube passes along the mill line. The central region of shoe 28 has a recess 37 therein which is immediately above and centered with respect to the vee of the unwelded portion of the tube. As gas tube 38 communicates with the recess 37 and provides means for admitting gas into the recess, as will be explained below.

Still referring to FIGS. 2 and 3, mandrel 40 is disposed within tube 10 in the region of the vee. Inner shoe 29 and a resilient pad 45 of an elastomeric material are positioned on the top surface of mandrel 40. Pad 45 resiliently urges shoe 29 into contact with the inner surface of the tubular formed strip 10.

Inner shoe 19 is illustrated in the perspective view of FIG. 4. The top surface of inner show 29 is contoured to conform to the inner surface of the unwelded tube 10, FIG. 3, and has a centrally disposed recess 47 which is centrally located with respect to the vee formed by edges 16 and 17. Recesses 37 and 47 in the two shoes have substantially identical horizontal cross sectional areas and are in alignment with each other so as to form a cavity 50 within which the edges 16 and 17 are disposed.

The upstream end of inner shoe 29 has an extended portion 54, FIGS. 2 and 4, to which is secured a fin 55 which fits within the open vee between edges 16 and 17. Fin 55 is made of a hard nonconductive material such as aluminum oxide and serves to maintain inner shoe 27 centered with respect to the vee so that recess 47 will remain in alignment with recess 37 as the tube 10 travels through the mill. As seen in FIG. 2, inner shoe 29 and resilient pad 45 are seated within a cutout in mandrel 40 to maintain them in an axially fixed position.

FIG. 2 shows that the downstream ends 28a and 29a of outer and inner shoes 28 and 29 are spaced slightly upstream from the apex or weld zone, 18. This is to prevent the metallic spume which usually is given off at the weld zone from accumulating in the cavity 50. If the spume accumulates in cavity 50 it will cause defects in the weld and possibly will destroy the shoes due to local induction heating. Additionally, if a sizable quantity of metallic spume builds up on the tips of the shoes, the shoes are raised up from the surfaces of the tube 10 and an excessive amount of gas escapes from cavity 50. As illustrated in FIG. 2, the downstream tips 28a and 29a of shoes 28 and 29 are slightly spaced from the surfaces of tube 10 so that they will not accumulate metal from the hot strip edges. This feature helps to minimize the problems just mentioned, and also helps to form the gas jet which is directed into the apex 18 of the vee. A spacing of between one-fourth to one-sixteenth inch between the tips 28a and 29a and the apex 18 has been found to be satisfactory for welding tubing 1 inch in diameter and 0.05 inch in wall thickness.

Figure 5:
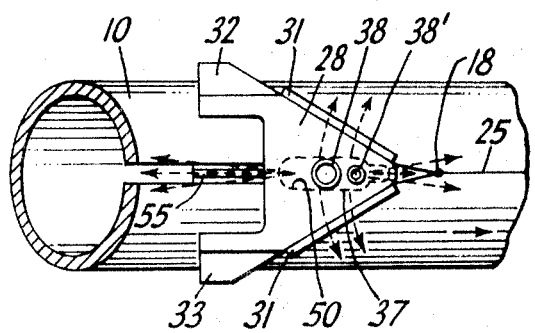
FIG. 5 is a simplified illustration showing the escape of gas from the gas shoes illustrated in FIGS. 1-3.

Fig. 5 is a simplified illustration showing outer shoe 28 and tube 10 and illustrating with broken-line arrows the flow of the gas or other substance that provides the controlled atmosphere. Inert gas such as argon, helium, etc., or a mixture of inert gases, or one or more reducing gases, or a welding flux in gas form, or in powder or mist form, or some other fluid substance intended to perform a specific function, is introduced into cavity 50 from gas tube 38 at a flow rate that may range between 20 and 200 cubic feet per hour, for example, when welding tubing of the size mentioned above. The static pressure within cavity 50 may range between 10 and 100 inches of water above atmospheric pressure. It should be noted that the pressures as stated are measured when the welding operation is under way and when the shoes and edges of the vee are heated. With a given rate of gas flow the pressure within cavity 50 will be higher when the high-frequency current is flowing than when it is not flowing and the tube edges and shoes are cooler.

It should be understood that the numbers and ranges given above are examples that have been found useful for one size tubing and in particular mill arrangement. With other size tubing and other mill arrangements the best values of fluid flow and pressures may be determined from experience. As previously mentioned a number of different substances may be used to provide the controlled atmosphere. For simplicity, the word "fluid" will be used to denote the substance irrespective of its chemical composition or form.

As seen in FIG. 2, the downstream tips 28a and 29a of the shoes are over the open portion of the vee and the tips of the shoes are slightly off the tube surfaces. As a result, gas escapes through the downstream ends of the shoes, FIG. 5, and into and around the apex 18 of the vee to envelop the weld zone in the controlled atmosphere, thus permitting the weld to be formed in a nonoxidizing environment. Further, the gas jet directed into the weld zone tends to blow away the mill fluid from the weld zone and prevents the mill fluid from contaminating the weld and further reduces the possibility that oxidation and reactions will lead to corrosion pitting along the weld line. The jet directed into weld zone 18 also blows away the fine weld spume and minimizes the possibility that it will accumulate in cavity 50.

As previously mentioned, outer shoe 28 is resiliently urged into contact with the outer surface of tube 10, and likewise, resilient pad 45, FIG. 3, resiliently urges inner shoe 29 into contact with the inner surface of the tube. Because there is relative axial motion between the shoes and the tube, and because of mechanical tolerances, the shoes in contact with the tube surfaces do not provide perfect fluid seals. Consequently there is some leakage of fluid all around the shoes.

FIG. 5 illustrates with broken-line arrows the flow of gaseous fluid about outer shoe 28 between the shoe and the outer surface of tube 10. As illustrated, the major portion of the fluid escapes in the jet at the downstream tips of the shoes and past fin 55 at the upstream end of the shoes. The escape of fluid between inner shoe 29 and the inner surface of tube 10 will be similar in nature to the illustration of FIG. 5 and for this reason will not be separately illustrated.

A second gas tube 38' is shown communicating with cavity 50. The function of this tube is to connect cavity 50 to a fluid pressure sensing means such as a manometer which permits continuous monitoring of the static pressure within cavity 50. It should be understood that there is no net flow of fluid through gas tube 38' while the system is in operation, and in this respect the second gas tube 38' is to be distinguished from the return flow gas tube shown in the above-cited German patent. It is helpful to continuously monitor the static pressure within cavity 50 because should the fluid pressure drop below desired levels it is an indication that a shoe has been damaged or for some other reason the system is not operating properly and thus possibly is producing a defective weld.

Fin 55, FIGS. 2 and 3, is positioned within the vee at the upstream end of the shoes and limits the escape of fluid at this end. Some fluid does flow past fin 55 and keeps ambient air from cavity 50 and also limits the amount of mill fluid that will be on the edges of the metal in the areas under the shoes. The escaping fluid also minimizes the amount of dirt and debris that can get to the region of the edges of the vee. Because these edges are heated by the high-frequency current flowing therein, oxidation and the presence of contaminants thereon is minimized.

An additional advantageous function performed by shoes 28 and 29 is that they physically scrape the surfaces of the tube in the region of edges 16 and 17 and thus remove dirt and debris from those surfaces.

I have found that by bathing both the heated edges and the apex of the vee in a controlled atmosphere a cleaner and more even weld line is formed. I further have found that with the arrangement of this invention, with a given rate of movement of the tube through the mill, less electrical energy is required to produce a good weld. Or, stated differently, with a given rate of expenditure of electrical energy, the speed of the tube through the mill may be increase. The basic reason, or reasons, why this advantage is achieved is not fully understood, but it is believed to result from the absence of oxide coating on the molten metal at the weld zone and from the absence of mill fluid at the weld zone.

Figure 6:
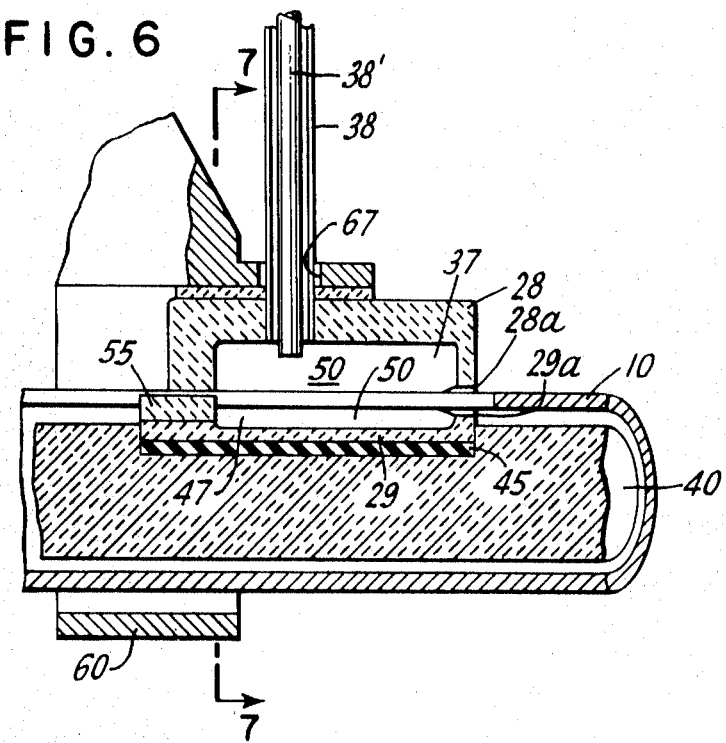
FIGS. 6 and 7 are sectional views illustrating the use of the gas shoes of this invention used in the high frequency induction welding method.
Figure 7:
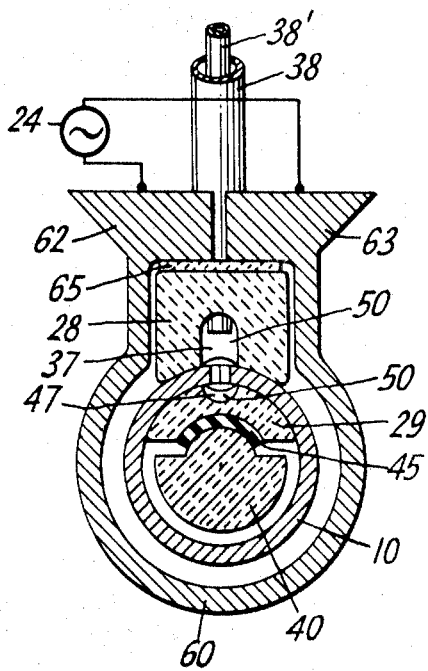

FIGS. 6 and 7 illustrate the present invention incorporated into high-frequency induction welding equipment rather than the high-frequency contact resistance welding equipment illustrated in FIG. 1. Outer shoe 28 and inner show 29 are substantially identical to the shoes illustrated in FIGS. 1–5 except that outer shoe 28 does not have the two extensions 32 and 33 at its upstream end for steadying it on the tube. In FIGS. 6 and 7 induction coil 60 surrounds tube 10 at a region upstream from the apex 18 of the vee. Induction coil 60 is shown as a single turn coil whose upper ends are connected to the large solid conductors 62 and 63. The source 24 of high-frequency oscillations is coupled to conductors 62 and 63 and the high-frequency current that flows in coil 60 induces a current flow in the tube 10. As is well understood in the art, the induced high-frequency current flows circumferentially around the bottom side of tube 10, but follows along the edges of the vee at the top side of the tube and heats the edges so that they are at welding temperature at the apex 18 where they are forced together by pressure rolls, not illustrated. Coil 60 could be a multiple turn coil if desired. Examples of induction welding coils are illustrated in U.S. Pat. No. 3,414,697.

Inner shoe 29 and resilient pad 45 are substantially the same as previously described and are seated in a notch within mandrel 40 just as described in connection with FIG. 2. Outer shoe 28 is disposed within a rectangularly shaped space formed at the top of coil 60. A resilient pad 65 of an elastomeric material resiliently urges outer shoe 28 into contact with the outer surface of tube 10 in the region over the vee. Gas tube 38 passes through an aperture 67 associated with conductors 62 and 63. In this embodiment of the invention gas tube 38' which connects cavity 50 with a gas pressure sensing device such as a manometer is disposed coaxially with respect to gas tube 38, rather than being spaced adjacent thereto. Obviously, either arrangement may be utilized.

From the above description it is seen that outer show 28 is held in place on tube 10 within the induction coil 60. Shoes 28 and 29 are aligned so that their respective recesses 37 and 47 form the gas cavity 50. In this embodiment of the invention it is not necessary that the downstream nose of outer shoe 28 contact the squeeze rolls since the outer shoe is suitably supported by coil 60.

The shoes illustrated in FIGS. 6 and 7 function in the same manner as previously described to bathe the heated edges and weld zone in a controlled atmosphere and to achieve the other advantageous features already discussed.

The present invention of providing a controlled atmosphere in and around the weld zone and around the heated edges of the vee may be utilized in the welding of structural members and shapes other than tubes and pipes. For example, I-beams and H-beams are fabricated by welding top and bottom flanges to the central web. The principle of forming vee configurations between the edges of the web member and the surfaces of the flanges again is followed. Such an arrangement is illustrated in simplified form in FIG. 8 wherein the top and bottom flanges 61 and 62 are welded to central web 63 by the use of high-frequency current.

Central web 63 passes longitudinally along the mill and top and bottom flanges 61 and 62 are brought into engagement with the respective edges of the web from locations above and below, respectively, the two edges by means of squeeze rolls such as roll 65 illustrated on the top of flange 61. A similar roll, not illustrated, forces bottom flange 62 into contact with the bottom edge of web 63. It thus is seen that the characteristic vees are formed between the two edges of web 63 and the respective flanges 61 and 62.

Electrical contact 67 contacts web 63 near its bottom edge and electrical contract 68 contacts flange 62 adjacent the region immediately under the bottom edge of web 63. High-frequency oscillator 70 supplies high frequency current to contacts 67 and 68 and, due to the proximity effect and skin effect, current flows in adjacent paths that follow along the bottom edge of web 63 to the apex of the vee and back along the surface of flange 62 in the region under web 63 to heat the edge and surface to welding temperature. The squeeze rolls force the members into firm contact to form the weld. Reference is made to U.S. Pat. Nos. 3,391,269 and 3,410,982 for further details of welding beams and similar structures.

Contacts similar to contacts 67 and 68, but not illustrated for sake of simplicity, contact web 63 adjacent its upper edge and contact upper flange 61 adjacent the region immediately above web 63 to supply high-frequency current to the vee formed by those two members, thereby heating those two members to permit them to be welded as they pass through the squeeze rolls.

Figure 8:
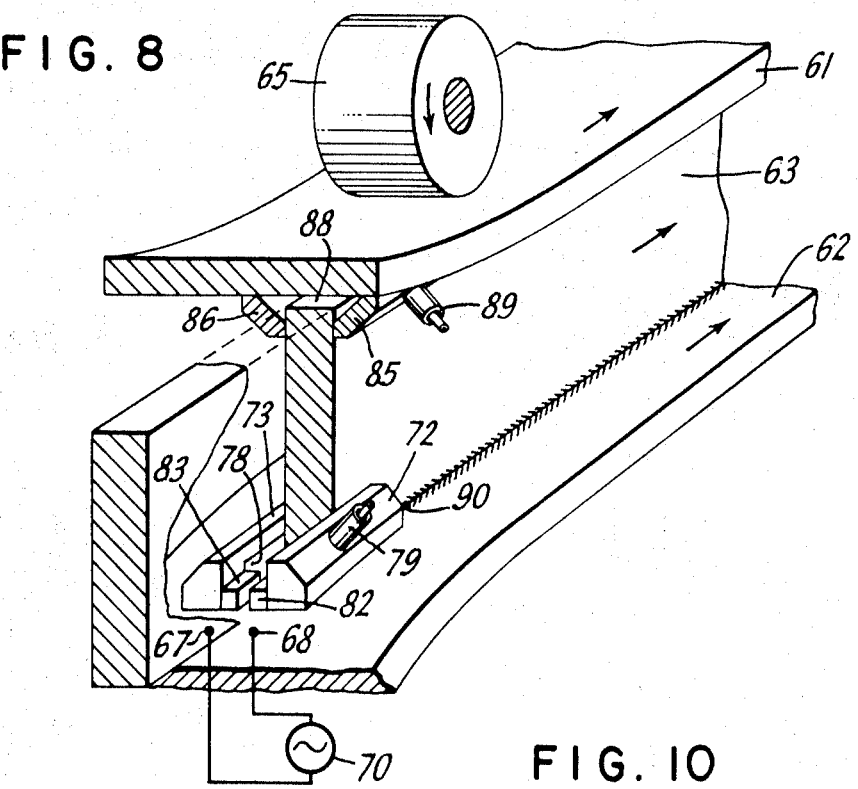
FIGS. 8-10 illustrate the practice of the present invention in the welding of an I-beam.
Figure 9:
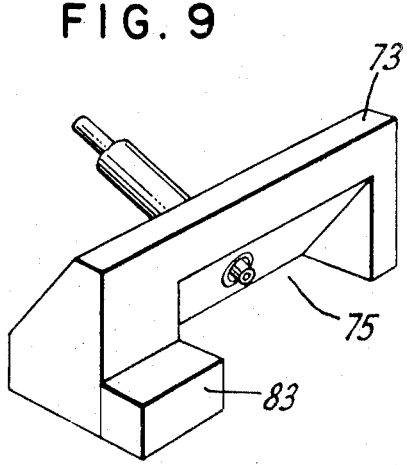

In accordance with this invention the apex of each vee and the heated edge and surface associated therewith are provided with a protective controlled atmosphere by a pair of gas shoes such as shoes 72 and 73. The back surfaces of shoes 72 and 73 are flat and fit against the opposite surfaces of web 63, and the bottom surfaces of the two shoes are contoured to fit against the top surface of the curved bottom flange 62. As illustrated in FIG. 9, both shoes are provided with a recess 75 so that when the two shoes are in place as illustrated in FIG. 8 a gas cavity 78 is formed. This is better illustrated in the sectional view of FIG. 10. The gaseous fluid that forms the controlled atmosphere is admitted to the cavity through gas tube 72, and desired static fluid pressures are maintained within cavity 78.

Shoes 72 and 73 have respective fins 82 and 83 at their upstream ends which fit within the vee. Fins 82 and 83 also serve to limit the escape of gas from cavity 78 and limit the entrance of mill fluid into cavity 78. If desired, only one of the shoes may have a fin so long as it performs the desired function. Shoes 72 and 73 may be supported by suitable mechanical means (not illustrated) that resiliently urge the shoes into contact with flange 62 and web 63. Any of a number of different types of supporting structures could be used, but since they are not the subject of this invention they have been omitted in order to simplify the drawings.

A second pair of shoes 85 and 86 are similarly positioned between the bottom surface of top flange 61 and the two sides of web 63 to form the cavity 88. Inert gas or one of the above-named fluid substances is admitted to cavity 88 through gas tube 89 so as to provide the controlled atmosphere at the heated portions of the vee. The shoes of FIG. 8 may be made of the same ceramic material described above.

Figure 10:
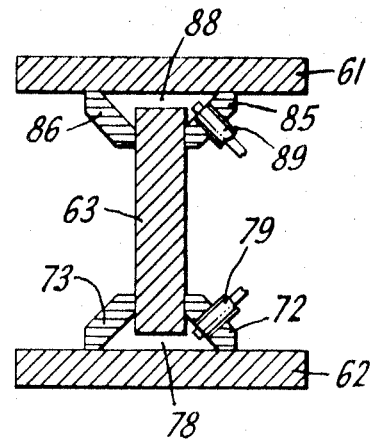

The shoes 72, 73, and 85, 86 of FIGS. 8 and 10 function in the same manner as described in connection with the shoes of FIGS. 1-7. That is, fluid escapes through the vee at the downstream ends of the shoes and is directed in jets into and around the apexes of the two vees at the top and bottom edges of web 63 to bathe the two weld zones, such as the weld zone 90 in FIG. 8, in controlled atmospheres. The cavities 78 and 88 also enclose the heated edges and surfaces of web 63 and flanges 61 and 62 in controlled atmospheres that prevent them from oxidizing prior to reaching the weld zone. Further, the fluid under pressure escapes from all around the shoes to keep ambient air and mill fluid from the cavities. In the embodiment of the invention illustrated in FIGS. 8-10, either of the previously discussed arrangements of gas tubes may be employed for sensing the static pressures within the shoes.

It is believed that it now will be obvious to those skilled in the art that various differently shaped members may be welded in a controlled atmosphere in accordance with this invention. For example, a fin may be welded to the surface of a tube or plate, plates or strips may be welded to form angle members, and various special structural shapes may be readily welded. Furthermore, lap welds and "squish" welds may be made as well as the butt welds illustrated. "Squish" welds are described in U.S. application Ser. No. 837,207, filed June 27, 1969 in the names of Harriau and Rudd. Accordingly, in the claims that follow, the phrase "portions" is used to designate the two parts that are welded irrespective of whether the weld is formed between butting or lapping edges, surfaces, or an edge and a surface.

It also will be appreciated that the entire body of a shoe need not be made of ceramic material as described. It may be desirable to make the shoes with only the portions at or adjacent the surfaces that contact the tube made of ceramic or some other high temperature and electrically nonconductive material. The remaining portions of the shoe then could be made of some other type of material.

What is claimed is:

1. The method of welding together two metallic portions in a controlled atmosphere wherein the two portions are continually advanced past the weld zone and wherein said portions are spaced apart upstream of the weld zone and brought together at the weld zone, and wherein high-frequency current is caused to flow along adjacent paths on the spaced portions to and from the weld zone to heat the two portions to welding temperature at the weld zone, said method comprising providing an imperfectly sealed fluid cavity which is disposed completely upstream of said weld zone to enclose therein only the heated regions of said portions,
supplying a fluid substance under pressure to said cavity,
allowing said fluid substance to escape downstream from the cavity into and around said weld zone and around the periphery of the cavity,
maintaining a sufficient fluid pressure in the cavity to cause the fluid substance to escape with sufficient velocity to exclude fluid other than said fluid substance from the cavity and to direct a jet of fluid substance downstream from the cavity and into and around the weld zone to envelope the weld zone in a controlled atmosphere.

2. The method of claim 1 which includes
directing some of said escaping fluid substance from said cavity upstream between the spaced-apart portions.

3. The method claimed in claim 2 wherein the fluid substance in said cavity is maintained at a sufficiently high static pressure to expel fluid substance therefrom at velocities sufficient to keep ambient air and mill fluid that may be present substantially out of the cavity and weld zone.

4. The method of welding together two metallic portions in a controlled atmosphere wherein the two portions are continuously advanced past a weld zone, said portions being spaced apart upstream of the weld zone and brought together at the weld zone, and wherein high-frequency current is caused to flow adjacent paths on the portions to and from the weld zone to heat the two portions to welding temperature at the weld zone, said method comprising placing first and second electrically nonconductive high-temperature shoe members having tranversely aligned recesses therein adjacent said two portions to enclose only adjacent regions of the portions immediately upstream of the weld zone within an imperfectly sealed cavity formed by the recesses in the shoes,
supplying a fluid substance under pressure to said cavity, said fluid substance having the capability of forming a controlled atmosphere at the weld zone,
allowing said fluid substance to escape downstream from said cavity into and around said weld zone and between the spaced portions upstream of said shoe members,
maintaining a sufficient fluid pressure in the cavity to cause the substance to escape with sufficient velocity to exclude ambient air from the cavity and to direct a jet of fluid substance downstream from the cavity and into the weld zone to envelop the weld zone in a controlled atmosphere and to blow weld spume from the weld zone.

5. The method claimed in claim 4 wherein the downstream tips of said shoe members are spaced upstream a fraction of an inch from said weld zone.

6. The method claimed in claim 4 wherein the fluid substance escapes from said cavity with sufficient velocity to substantially exclude mill fluid from the cavity and weld zone.

7. The method of welding together two metallic portions in an inert atmosphere wherein the two portions are continuously advanced past a weld zone, said portions being spaced apart upstream of the weld zone and brought together at the weld zone thereby defining a vee configuration having its apex at the weld zone, and wherein high-frequency current is caused to flow along said vee to heat the two portions in the region of the vee, said method comprising resiliently urging first and second electrically nonconductive, high-temperature shoe members having transversely aligned recesses therein in conforming sliding contact with respective pairs of surfaces of the two metallic portions to enclose only the region of the vee configuration immediately upstream of the weld zone within an imperfectly sealed cavity formed by the recess in the shoes,
supplying an inert gas under pressure to said cavity, and maintaining a sufficient gas pressure in the cavity to cause gas to escape from between the shoes and the adjacent surfaces of the metallic portions, and to escape downstream from the cavity into and around said weld zone, the gas pressure within said cavity being maintained sufficiently high to cause the gas to escape in a jet directed downstream from the cavity and into said weld zone to substantially completely envelop the weld zone in a protective controlled atmosphere.

8. The method claimed in claim 7 wherein the static pressure of the gas within said cavity ranges between 10 and 100 inches of water above atmospheric pressure.

9. The method claimed in claim 7 wherein the inert gas is supplied to said cavity at a rate ranging between 20 and 200 cubic feet per hour.

10. Apparatus for welding together in a controlled atmosphere two metallic portions that are advanced past a weld zone, said portions being spaced apart upstream of the weld zone and brought together at the weld zone, thereby defining a vee configuration having its apex at the weld zone, and wherein high-frequency current is caused to flow along the vee to heat the two portions in the region of the vee, said apparatus comprising first and second gas shoes disposed entirely upstream from said weld zone and having transversely aligned recesses therein and resiliently urged into contact with said metallic portions to enclose the major part of the heated vee configuration within a gas cavity, the surfaces of said shoes contact with the metallic portions being contoured to provide a close but nonsealing contact therebetween, means for applying a fluid substance under pressure to said cavity and for maintaining a static fluid pressure therein sufficient to cause fluid substance to escape from all about the regions of contact of the shoes with said metallic portions and to escape in a jet directed downstream from the cavity and around said weld zone, the velocity of the escaping fluid being sufficient to keep the heated region of the vee and the weld zone substantially free of air and fluids other than said fluid substance.

11. The apparatus claimed in claim 10 wherein said shoes are spaced upstream from the weld zone by a fraction of an inch to minimize the accumulation of weld spume in said cavity.

12. The apparatus claimed in claim 10 wherein the downstream tips of the shoes are slightly raised from the two metallic portions.

13. Apparatus for forming a welded tubular member in the presence of a controlled atmosphere wherein first and second edges are advanced past a weld zone, said edges being spaced apart upstream of the weld zone and brought together at the weld zone thereby defining a vee configuration having its apex at the weld zone, and wherein high-frequency current is caused to flow along the edges of the vee in the region upstream of the weld zone to heat said edges, said apparatus comprising, first and second gas shoes respectively disposed on the outer and inner surfaces of the tubular member at said upstream region of the vee where the edges are heated, said shoes terminating a fraction of an inch upstream from said weld zone, the surfaces of the shoes in contact with the tubular member being contoured to conform to the tubular surfaces, and said surfaces of the shoes having transversely aligned recesses therein to form a gas cavity that encloses at least a major portion of said heated edges, said cavity being imperfectly sealed at the regions where the contoured surfaces of the shoes contact the tubular member, means for supplying a fluid substance under pressure to said cavity and for maintaining a static fluid pressure therein sufficient to cause fluid to escape from all about the regions of the contact of the shoes with the tubular member and to escape in a jet into and around said weld zone, whereby said heated edges and said weld zone are immersed in a controlled atmosphere, the velocity of the escaping fluid being sufficient to keep the heated edges and the weld zone substantially free of ambient air and fluids other than the said fluid substance.

14. The apparatus claimed in claim 13 wherein the static pressure of the fluid substance within the cavity ranges between 10 and 100 inches of water above atmospheric pressure.

15. The apparatus claimed in claim 13 wherein said fluid substance is supplied at a rate ranging between 20 and 200 cubic feet per hour.

16. Apparatus for welding in the presence of a controlled atmosphere the edge of a narrow member to the surface of a wider member, wherein said edge and said surface are spaced apart upstream of a weld zone and are brought together at the weld zone, and wherein high-frequency current is caused to flow along said edge and surface in the region upstream of the weld zone to heat said edge and the adjacent region on said surface, the apparatus for providing the controlled atmosphere comprising first and second gas shoes disposed on opposite sides of the narrow member and each in contact with the surface of said wider member and with a respective surface of the narrow member at the region where said edge and surface are heated, said shoes terminating at their downstream ends a fraction of an inch upstream from said weld zone, the surfaces of the shoes in contact with said members being contoured to conform thereto, and said shoes having facing and transversely aligned recesses to form a gas cavity that encloses at least a major portion of the heated edge and surface, said cavity being imperfectly sealed at the regions where the contoured surfaces of the shoes contact the respective members, means for supplying a fluid substance under pressure to said cavity and for maintaining a static pressure therein sufficient to cause said fluid substance to escape from all about the regions of contact of the shoes with the members and to escape downstream from the cavity in a jet into and around said weld zone, whereby said heated edge and surface and said weld zone are immersed in a controlled atmosphere, the velocity of said escaping fluid substance being sufficient to keep the heated edge and surface and the weld zone substantially free of air and fluids other than said fluid substance.

17. Apparatus for welding together in a controlled atmosphere two metallic portions that are advanced past a weld zone, said portions being spaced apart upstream of the weld zone and brought together at the weld zone, and wherein high-frequency current is caused to flow along the two portions to and from the weld zone to heat the two portions to welding temperature, said apparatus comprising first and second gas shoes disposed entirely upstream from said weld zone and having transversely aligned recesses therein and resiliently urged into contact with said metallic portions to enclose at least part of the spaced-apart heated portions within a cavity, the surfaces of said shoes in contact with the metallic portions being contoured to provide a close but nonsealing contact therebetween, and the downstream tips of said shoes being spaced from said portions to form a fluid jet exhaust from the cavity, means for applying a nonoxidizing fluid substance under pressure to said cavity and for maintaining a static fluid pressure therein sufficient to cause fluid to escape from all about the regions of contact of the shoes with said metallic portions and to escape in a jet directed downstream from the cavity and into and around said weld zone thereby to blow weld spume out of said weld zone and away from the space-apart portions.

* * * * *